Jan. 4, 1949.　　　C. F. BALL　　　2,457,801
FRICTION CLUTCH WITH ADJUSTMENT FOR
TORQUE TRANSMITTING CAPACITY
Filed Sept. 20, 1944
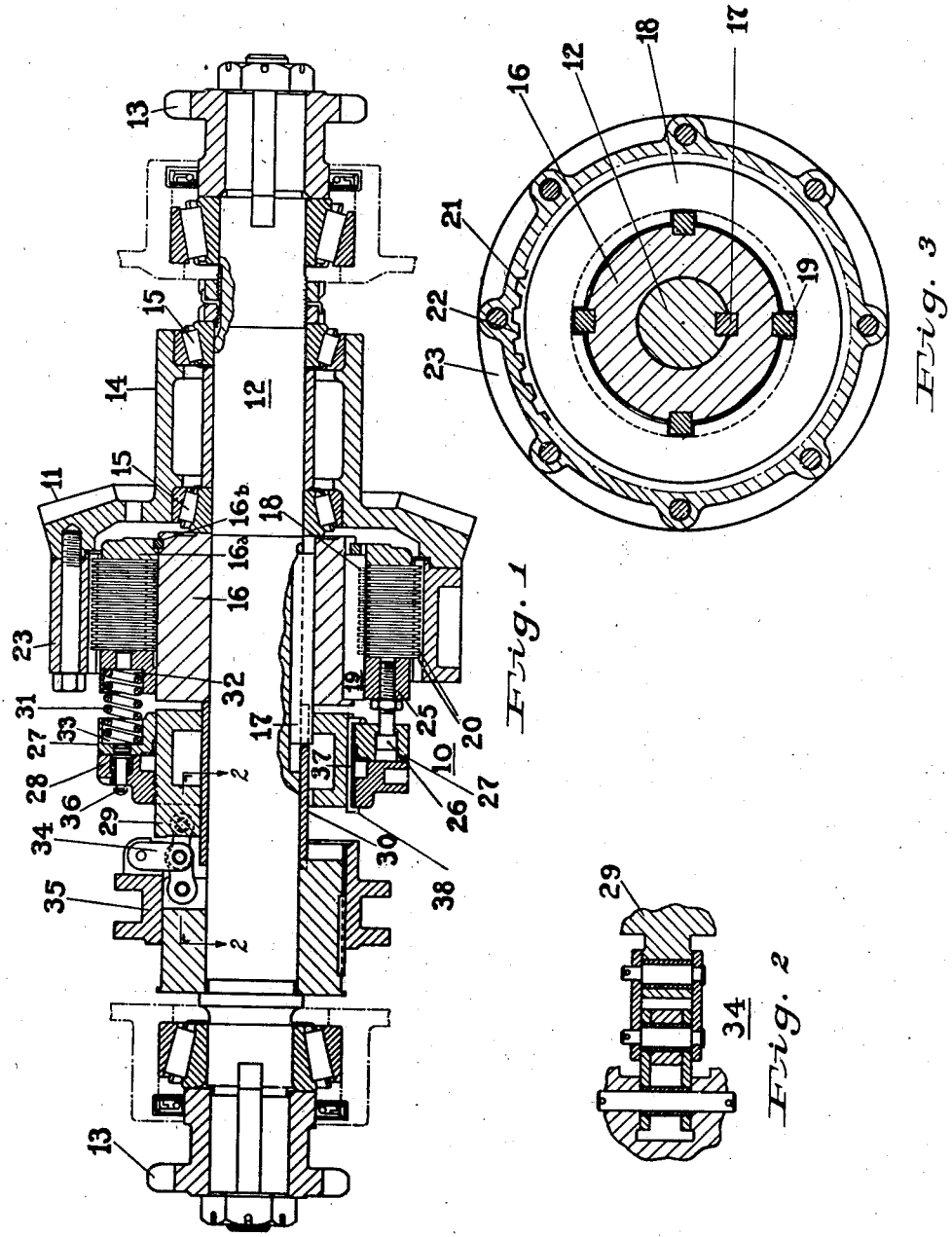
INVENTOR
*Charles F. Ball*
BY
*Harold W. Hawkins*
ATTORNEY Patented Jan. 4, 1949

2,457,801

UNITED STATES PATENT OFFICE 2,457,801

FRICTION CLUTCH WITH ADJUSTMENT FOR TORQUE TRANSMITTING CAPACITY

Charles F. Ball, Franklin, Pa., assignor to Joy Manufacturing Company, a corporation of Pennsylvania Application September 20, 1944, Serial No. 554,994

15 Claims. (Cl. 192—54)

This invention relates to friction clutches, and more particularly to clutches of the type adapted to limit the torque applied to a driven member.

Friction clutches of the torque limiting type are required in the power drives of many different kinds of machinery such as mining machinery and the like, where one power source may be used to perform several different functions, and the power available may be several times that required to perform a particular function and failure of that function is liable to occur unless some mechanical means are provided for limiting the overload.

In friction clutches of this general type, spring pressure is applied to engage the clutch parts to start and maintain the drive, and mechanical means are employed to disengage the clutch to stop the drive. The springs are employed to exert a predetermined force on the clutch parts. When the torque exceeds the frictional force applied by the springs, the clutch members slip, and overload is thereby prevented. The arrangement of the springs is such that when the clutch is engaged, the minimum amount of force is exerted on the clutch parts, and the force of the springs increases as the mechanical means are operated to disengage the clutch. That is to say, the springs are compressed by the action of the clutch disengaging means, and as the force of the springs must be overcome over a relatively long distance, the effort required to disengage the clutch is so great that frequently power operated means must be provided to actuate the clutch disengaging means.

The principal object of this invention is to provide a friction clutch adapted to be engaged by axial pressure, having a novel spring-loaded pressure member interposed between the pressure creating means and the friction means to limit the torque capacity of the clutch.

Another object is to provide a friction clutch having adjustable means for applying a predetermined pressure to one of the clutch engaging members which will positively assist in the engaging and disengaging of the clutch.

A further object is to provide a friction clutch adapted to be engaged by axial pressure in which one of the clutch engaging members is subjected to predetermined pressure which is capable of being readily adjusted to vary the torque which will be delivered by the clutch.

A still further object is to provide a friction clutch adapted to be engaged by axial pressure in which one of the clutch engaging members is constantly subjected to a predetermined spring pressure for limiting the torque capacity of the clutch.

A still further object is to provide a friction clutch adapted to be engaged by axial pressure, in which the torque delivered by the clutch can be readily and easily determined and controlled, and which is easily and readily operated to engage and disengage the clutch members to start and stop the drive.

These and other objects which will hereinafter be made apparent to those skilled in this particular art are accomplished by means of this invention, one embodiment of which is described in the following specification and illustrated in the accompanying drawings, wherein:

Fig. 1 is a sectional view of a clutch made in accordance with my invention;

Fig. 2 is an enlarged section taken on line II—II of Fig. 1; and

Fig. 3 is a section taken between the discs of the clutch.

In the drawings I have illustrated my improved clutch, designated in its entirety as 10, as a means for transmitting power from a driven beveled ring gear 11 to a shaft 12 having drive sprockets 13 on the ends thereof. The gear 11 is provided with a hub 14 which is journaled on the shaft 12 and held in proper relation thereto by antifriction bearings 15.

The clutch 10 is composed of an inner hub 16 which is secured to the shaft 12 by a key 17. The hub 16 carries a back-up plate 16a, which is held in place on the hub by a locking ring 16b, and a series of clutch discs 18, all of which are secured to the hub by keys 19. Interposed between back pressure plate 16a and the first disc 18, and between each succeeding pair of clutch discs 18 is a clutch plate 20 having a toothed outer edge 21 which engages the splined inner surface 22 of an outer hub 23 bolted to the ring gear 11.

The clutch plates 18—20 are locked in frictional engagement with each other to engage the clutch 10 by a front pressure plate 25 slidably mounted on the forward end of the inner hub 16. Pressure plate 25 is connected by bolts 26 with an adjusting member or plate 27 which is secured by nut 28 to a member 29 slidably mounted on a sleeve 30 surrounding the shaft 12. Key 17 also engages the member 29 and causes it to rotate with the hub 16 and shaft 12.

Disposed between the pressure plate 25 and the adjusting member 27 are a series of coil springs 31 having their ends contained in pockets 32 and 33 in the plate and member respectively. Springs 31 are held in compression and the amount of compression of the springs can be readily adjusted by means of the bolts 26 to vary the pressure exerted on the plate 25.

Sliding member 29 is attached by a series of toggle links 34 to a sliding clutch collar 35.

The pressure plate 25, adjusting member 27, and springs 31 are assembled as a unit, and the bolts 26 are adjusted to place the springs 31 under a selected predetermined compression, after which the adjusting member 27 is secured in position on the member 29. Spring pressed detents 36 carried by the nut 28 lock the nut to the adjusting plate and prevent the accidental displacement thereof.

The adjusting plate 27 is so adjusted relative to the sliding member 29 that when the toggle links are moved to the position shown in Fig. 1, the clutch plates 18—20 will not only be forced together, but the adjusting plate will be moved approximately 1/16 of an inch toward the pressure plate 25 to further compress the springs 31.

From this arrangement it is apparent that the proper degree of pressure is exerted on the clutch plates 18—20 to produce the desired torque, and that the torque delivered can be readily adjusted by varying the preloaded pressure of the springs and by varying the position of the adjusting member 27 relative to the member 29. It should also be noted that my improved clutch is easily and quickly engaged because the springs are preloaded, and the additional compression of the spring does not take place until after the toggle links 34 approach their straight line position as shown in Fig. 1.

To disengage the clutch plates 18—20, the clutch collar 35 is moved to the left (Fig. 1) which causes the toggle links 34 to break and withdraw the member 29 and the adjusting plate 27 and pressure plate 25 carried thereby, which permits the clutch plates to separate. In my improved clutch, disengagement of the plates is easily accomplished without undue force because the springs 31, being under compression, actually assist in disengaging the clutch, since the pressure of the springs 31 causes the toggle links 34 to break as soon as they have been moved off dead center.

In order that the pressure plate 25 will be positively moved out of engagement with the adjacent end clutch disc 20 when it is desired to disengage the clutch, I prefer to lock the adjusting member 27 to the nut 28 so that as the sliding member 29 is withdrawn, the member 27 will also be positively withdrawn. To secure this positive action I lock the member 27 to the nut 28 by a series of keys 37 having outwardly formed ends 38 engaging the sides of the adjusting member and nut respectively.

While I have illustrated and described a friction clutch in which the movable plate is under a preloaded spring pressure, it is understood that under certain conditions this arrangement may be reversed, and the back clutch plate 16a be subjected to the pressure of the preloaded springs, in which case the sliding member 25 would only be employed to engage the clutch.

From the foregoing description of my invention, it is apparent that my improved friction clutch is easy to assemble, positive in operation, and readily moved to its engaged and disengaged positions. It is understood that while I have shown one embodiment of my invention, certain changes, modifications, alterations, substitutions, additions, and omissions may be made therein without departing from the spirit of my invention or the scope of the appended claims.

I claim:

1. In a friction clutch having a series of clutch discs, the combination of a pressure plate, an adjusting member bolted to said pressure plate, springs under compression disposed between said pressure plate and said adjusting member, and means for moving said pressure plate axially into and out of loading pressure applying relation to said clutch discs including a member sliding axially, to which member said adjusting member is attached for movement as the former slides and relative to which member said adjusting member is axially adjustable to different fixed relations.

2. In a friction clutch having a series of clutch discs, the combination of a pressure plate, an adjusting member bolted to said pressure plate, springs under compression disposed between said pressure plate and said adjusting member, an axially sliding member supporting said adjusting member, means for locking said adjusting member to said supporting member and toggle means for moving said sliding member axially to positively engage and disengage said clutch.

3. In a friction clutch having a series of clutch discs, the combination of a pressure plate for forcing said discs into frictional engagement, an adjusting member spaced from but secured to said pressure plate, preloaded springs between said pressure plate and said adjusting member, a nut adjacent to said adjusting member and held in fixed relation thereto, a clutch operating collar, and means associated with said collar for positively moving said nut, adjusting member and pressure plate axially as a unit.

4. In a friction clutch having a series of clutch discs, the combination of a pressure plate adapted to be moved axially to force said discs into frictional engagement, an adjusting member spaced from but secured to said pressure plate, preloaded springs between said pressure plate and said adjusting member, and means for positively advancing and retracting said adjusting member and the pressure plate secured thereto into clutch engaging and disengaging positions including at least one toggle device having with said adjusting member an operative connection which is adjustable to alter the position occupied by said adjusting member when said toggle device is in its extended position.

5. In a friction clutch, the combination comprising a member held against axial movement, a movable member, a clutching element between said members, means for maintaining one of said members under predetermined pressure, means for positively advancing said movable member into engagement with said clutching element to engage said clutch and for positively withdrawing said member from contact with said clutching element to disengage said clutch, said means for positively moving said movable member including another element with which other element said movable member is movable and which has a connection with said movable member adjustable to alter their relative axial positions, and means for positively advancing and withdrawing said other element.

6. In a friction clutch having a series of clutch discs, the combination comprising a pressure plate for forcing said discs into frictional engagement, an adjusting member spaced from but secured to said pressure plate, compression springs disposed between said pressure plate and said adjusting member, an axially sliding member supporting said adjusting member, means for locking said adjusting member on said sliding member for movement therewith and means for moving said sliding member axially to positively move said pressure plate into and out of loading pressure applying relation to the clutch discs.

7. In a friction clutch having a series of clutch discs, the combination comprising a pressure plate for forcing said discs into frictional engagement, an adjusting member spaced from but secured to said pressure plate, compression springs disposed between said pressure plate and said adjusting member, an axially sliding member supporting said adjusting member, a backing-up nut threaded on said sliding member, means for locking said adjusting member to said nut, and means for moving said sliding member axially to positively move said pressure plate into and out of loading pressure applying relation to said clutch discs.

8. In a friction clutch having a series of clutch discs, the combination of a pressure plate, an adjusting member bolted to said pressure plate, springs associated with said pressure plate and said adjusting member for biasing them apart, and means for moving said pressure plate axially into and out of loading pressure applying relation to said clutch discs including a member sliding axially, to which member said adjusting member is attached for movement as the former slides and relative to which member said adjusting member is axially adjustable to different fixed relations.

9. In a friction clutch having a series of clutch discs, the combination of a pressure plate, an adjusting member bolted to said pressure plate, spring means associated with said pressure plate and said adjusting member for yieldingly maintaining them separated, an axially sliding member supporting said adjusting member, means for locking said adjusting member to said supporting member and toggle means for moving said sliding member axially to positively engage and disengage said clutch.

10. In a friction clutch having a series of clutch discs, the combination of a pressure plate for forcing said discs into frictional engagement, an adjusting member spaced from but secured to said pressure plate, preloaded springs associated with said pressure plate and said adjusting member for maintaining them separated, a nut adjacent to said adjusting member and held in fixed relation thereto, a clutch operating collar and means associated with said collar for positively moving said nut, adjusting member and pressure plate axially as a unit.

11. In a friction clutch having a series of clutch discs, the combination comprising a pressure plate for forcing said discs into frictional engagement, an adjusting member spaced from but secured to said pressure plate, springs associated with said pressure plate and said adjusting member for maintaining the same yieldingly in spaced relation, an axially sliding member supporting said adjusting member, means for locking said adjusting member on said sliding member for movement therewith and means for moving said sliding member axially to positively move said pressure plate into and out of loading pressure applying relation to the clutch discs.

12. In a friction clutch having a series of clutch discs, the combination comprising a pressure plate for forcing said discs into frictional engagement, an adjusting member spaced from but secured to said pressure plate, spring means associated with said pressure plate and said adjusting member for yieldingly maintaining them separated, an axially sliding member supporting said adjusting member, a backing-up nut threaded on said sliding member, means for locking said adjusting member to said nut for axial movement with the latter, releasable means for locking said nut to said adjusting member to prevent relative rotation between them, and means for moving said sliding member axially to positively move said pressure plate into and out of loading pressure applying relation to said clutch discs.

13. In a friction clutch having a series of clutch discs, the combination comprising a pressure plate for forcing said discs into frictional engagement, an adjusting member spaced from but secured to said pressure plate, spring means associated with said pressure plate and said adjusting member for yieldingly maintaining them separated, an axially sliding member supporting said adjusting member, a nut threaded on said sliding member, means for holding said adjusting member to said nut for axial movement with the latter, releasable means for locking said nut to said adjusting member to prevent relative rotation between them, and means for moving said sliding member axially to positively move said pressure plate into and out of loading pressure applying relation to said clutch discs.

14. In a friction clutch, a back-up plate, clutch discs, a pressure plate, an adjusting member, means for limiting the separation between said pressure plate and said adjusting member, spring means exerting a pressure tending to separate said pressure plate and said adjusting member, a member slidable to effect clutch loading and release and supporting said adjusting member for axial movement therewith but said members being normally held against rotation relatively to each other, a nut threadedly engaged with said second mentioned member, means for connecting said nut to said adjusting member preventing their axial separation but permitting their relative rotation, releasable means for locking said nut in non-rotatable relation to said adjusting member, and means for moving said second mentioned member in opposite directions to effect clutch application and release.

15. In a friction clutch, a clutching element, a backup member at one side of said clutching element, a second member at the other side of said clutching element movable relatively to said backup member for effecting clutch application on predetermined movement thereof towards said backup member, preloaded yielding means associated with one of said members yieldable upon the attainment of a predetermined clutch loading pressure, and an operator controllable member movable towards and from said backup member to move said second member to effect clutch loading and release and having an adjustable connection between itself and said second member.

CHARLES F. BALL.

REFERENCES CITED

The following references are of record in the file of this patent:

UNITED STATES PATENTS

| Number | Name | Date |
|---|---|---|
| 1,188,041 | Clarke | June 20, 1916 |
| 1,998,986 | Foster | Apr. 23, 1935 |
| 2,322,326 | Taylor | June 22, 1943 |
| 2,341,747 | Vincent | Feb. 15, 1944 |